United States Patent [19]

Fiorentino

[11] 4,026,424
[45] May 31, 1977

[54] CARRIER DIVERTER GATE FOR CONVEYOR SYSTEM

[75] Inventor: Ermenegildo Fiorentino, Bridgeport, Pa.

[73] Assignee: Burroughs Corporation, Detroit, Mich.

[22] Filed: Dec. 16, 1975

[21] Appl. No.: 641,297

[52] U.S. Cl. ............................... 214/11 R; 104/88; 209/74 M; 198/362
[51] Int. Cl.² ........................................ B65G 43/00
[58] Field of Search ...................... 214/11 R, 11 C; 198/31 R, 31 AC, 31 AB, 38; 104/88; 209/74 M, 72–73

[56] References Cited
UNITED STATES PATENTS

| | | | |
|---|---|---|---|
| 2,918,881 | 12/1959 | Klamp et al. | 104/88 |
| 2,990,936 | 7/1961 | Pearson | 198/38 |
| 3,559,584 | 2/1971 | Frantz et al. | 104/88 |
| 3,734,027 | 5/1973 | Brummett et al. | 104/88 X |
| 3,834,315 | 9/1974 | Warner | 104/88 |
| 3,884,370 | 5/1975 | Bradshaw et al. | 214/11 R |

Primary Examiner—Albert J. Makay
Assistant Examiner—R. B. Johnson
Attorney, Agent, or Firm—Kevin R. Peterson; Edmund M. Chung; Francis A. Varallo

[57] ABSTRACT

The present disclosure describes an improved gate for selectively diverting item-supporting carriers from a transport path on a powered conveyor to their ultimate destination via an alternate path. More specifically, the gate finds application in a mail-handling system which requires the routing of carriers during the processing operation. In this regard, selected carriers may be diverted from the conveyor belts on which they are being transported onto a gravity turn effected by the gate itself, and then permitted to continue unaided to their destination by means of an inclined rail or similar structure.

7 Claims, 5 Drawing Figures

CARRIER DIVERTER GATE FOR CONVEYOR SYSTEM

CROSS REFERENCE TO RELATED APPLICATION

In patent application Ser. No. 401,954 which has issued as U.S. Pat. No. 3,884,370 for "System for Sorting and Processing Articles Including Flat Mail Pieces" by Robert S. Bradshaw et al, there is described a system which may be used to sort and process mail pieces known as flats which cannot be processed on letter mail equipment. Mechanical carriers are used to support the flats during the processing cycle. A monorail conveyor distribution system provides transport, storage, and switching of the carriers. The present diverter gate may be advantageously utilized in conjunction with the conveyor and carriers of the patented system. The aforementioned patent is assigned to the same assignee as the present application.

BACKGROUND OF THE INVENTION

As illustrated and described in the reference patent, the carriers which support the items being processed are generally transported on straight runs by a horizontal timing belt. They may however, be directed to a desired destination by gating onto a vertical belt which provides turns in a horizontal plane, and then returned to another horizontal belt. In this arrangement, the vertical elevation of the vertical belt with respect to that of the horizontal belt must be carefully controlled. For example, in a gated transfer from a horizontal to a vertical belt, the vertical belt must approach the transfer area at a vertical elevation less than that of the horizontal belt, but within the transfer area assume an elevation which equals and then surpasses the elevation of the horizontal belt. The horizontal displacement of the two belts in the transfer area is an important design consideration.

While the gating arrangements described hereinbefore are highly satisfactory in an actual operative environment, it should be noted that current emphasis on energy saving techinques and design simplicity have prompted interest in systems which substitute, wherever possible, gravity force for powered transport. The diverter gate of the present invention falls within the scope of such a system.

SUMMARY OF THE INVENTION

In accordance with the present invention, a gate is provided for use in an item transport system wherever gravity may be successfully utilized in the conveyance of the items being processed. It should be noted that the gating and switching techniques taught in the reference patent and mentioned hereinbefore may also be used in the same system. It is therefore assumed that the carrier will be compatible for either powered or gravity movement.

In operation, the carrier is transported by a belt having its surface in a horizontal plane. This horizontal belt runs in a "U" channel in which one edge of the channel serves as a guide rail to retain the carrier on the belt. The gate of the present invention substitutes a flexible element for a portion of the guide rail, and positons the element in substantial alignment with the remainder of the rail. The carrier head is designed to envelop the rail. Attached to the gate element is a bar which is capable of limited rotation about a pivot. Means are provided for selectively causing rotation of the bar about the pivot. This results in a deflection of one end of the gate member about its mounting point.

If the gate is in a non-diverting position, the carrier moves past the gate and is unaffected thereby. However, if the gate is in a diverting position, the carrier is caused to move sideways on the plane of the horizontal belt for a given distance, while the carrier head is permitted to remain in driving contact with the belt. Subsequently, the carrier head pivots about the horizontal belt and the carrier drops onto the inclined portion of the gate. At the end of the latter portion, an inclined rail or like means provides a gravity path for the carrier to transport it to its destination. The gate is returned to its non-diverting position as soon as the carrier has moved off of its inclined portion. It is to be noted that the entire gating operation is accomplished with minimum design complexity and high reliability.

Other features and advantages of the present invention will become apparent in the detailed description appearing hereinafter.

DESCRIPTION OF THE PREFERRED EMBODIMENT

The structure and mode of operation of the present gate are best appreciated by considering the non-diverting and diverting gate positions. The former is shown in FIG. 1; the latter, in FIG. 4.

Figure 1:
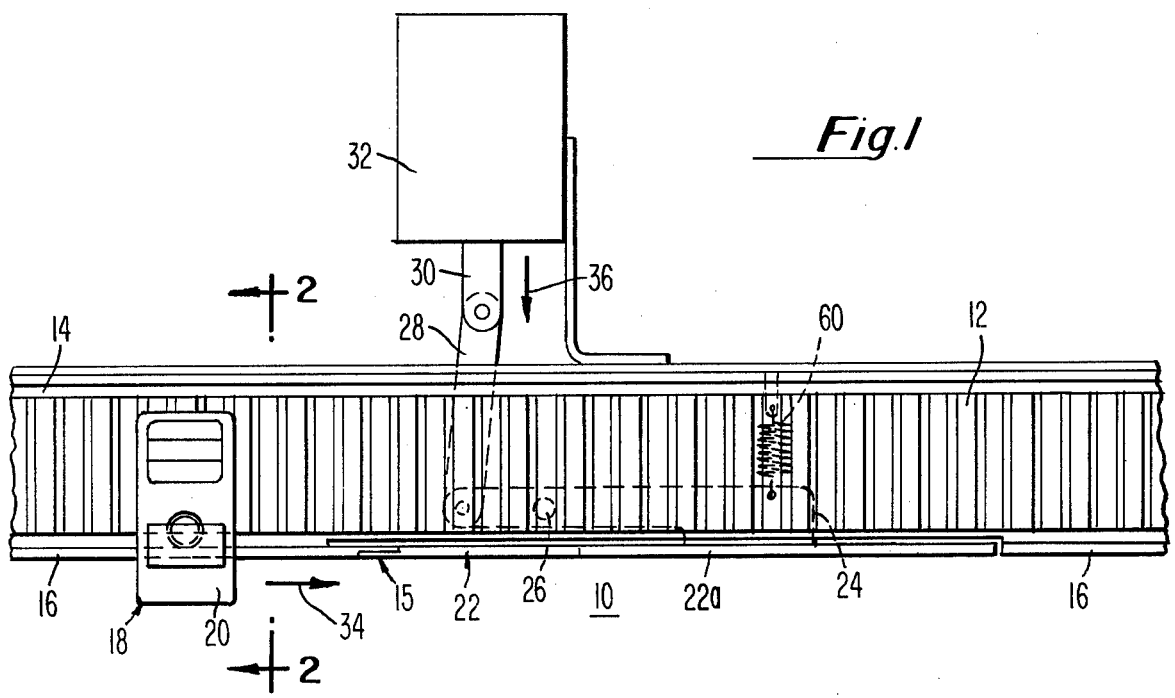
FIG. 1 is a plan view of the present gate shown in a non-diverting position.

In the plan view of the gate 10 in FIG. 1, there is shown a portion of a horizontal timing belt 12 carried in a "U" channel 14, the latter having at least one edge which serves as a guide rail 16. A carrier 18, has its head portion 20 positioned on the surface of the moving belt 12 and enveloping the guide rail 16. In the desired transfer or gating area, the guide rail 16 is absent. The gate 10 comprises a flexible member 22 which occupies the transfer area and in the non-diverting mode is substantially coplanar with the vertical portions of the guide rails 16 appearing on either side thereof. One end of the flexible member 22 is fixed in relation to rail 16, such as at point 15 in FIG. 1, where it is assumed that a portion of the member has been bonded to the rail. Attached to the member 22 is one end of a bar 24 which is capable of limited rotation about a pivot 26. The extremities of a link 28 are pivotally connected to the respective opposite end of bar 24 and to the plunger 30 of a solenoid 32.

The top edge of member 22 is collinear with the top of the guide rail 16 for a distance $x$, beyond which the gate member has a portion 22a which is inclined to the horizontal by a predetermined angle. This is clearly shown in FIG. 5. Although in the non-diverting gate position of FIG. 1, no guide means are present for the length of the inclined portion 22a, the distance is relatively short and friction forces prevent carrier 18 from slipping off the belt 12.

In the non-diverting position of FIG. 1, the carrier 18 is depicted as being transported on the powered moving flat belt 12 in the direction of arrow 34 and approaching the gate 10. The solenoid 32 is not energized and its plunger 30 is extended in the direction of the arrow 36, thereby permitting the gate member 22 to reside in substantial alignment with the guide rail 16. The gate member thus appears to the carrier 18 as an extension of the rail 16, and belt 12 drives the carrier past the gate to its destination.

Figure 4:
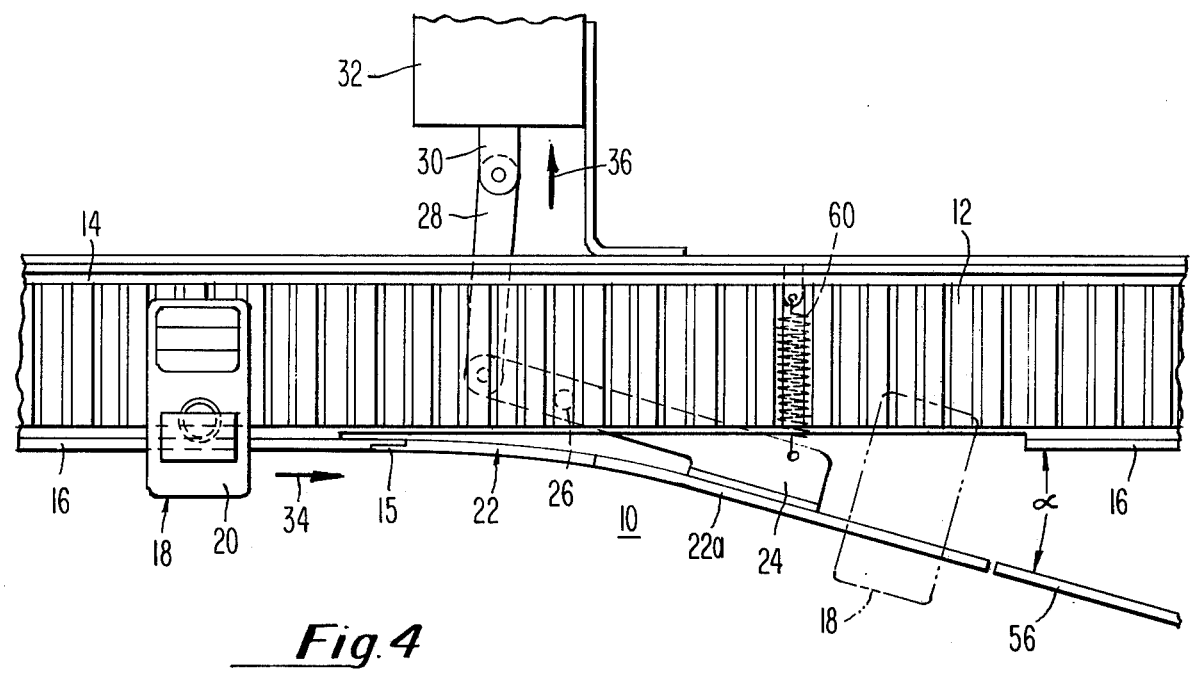
FIG. 4 depicts in plan view, the present gate in a diverting position.

Before proceeding with a description of the energized condition of solenoid 32 and the establishment of the diverting condition, as seen in FIG. 4, it is believed helpful to examine briefly the structure of the carrier 18. It should be observed that the particular carrier configuration described herein has been chosen solely for purposes for illustrating the gate operation and is not limitative of the invention. Moreover, a detailed description of the carrier and its relationship to both horizontally and vertically oriented belts may be found in the referenced patent.

Figure 2:
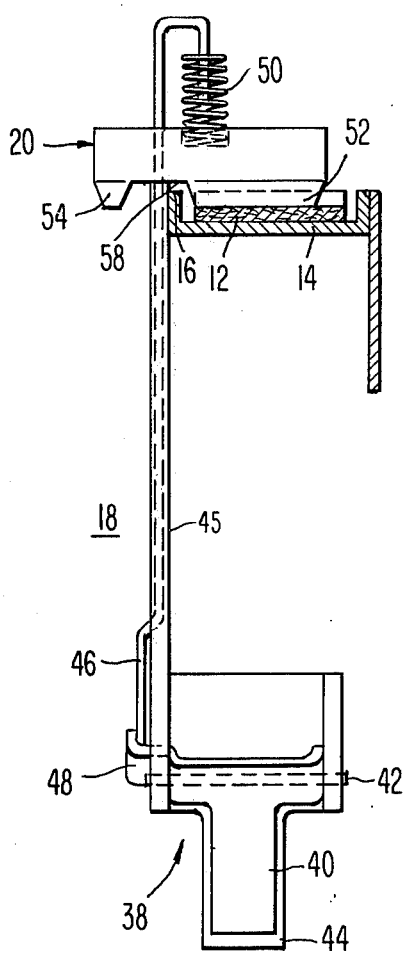
FIG. 2 is a section view taken along lines 2—2 of FIG. 1 illustrating the relationship of a carrier, such as that disclosed in the reference patent, to the horizontal timing belt and the gate of FIG. 1.

With reference to FIG. 2, the carrier 18 is comprised of a T-shaped head section 20, which may be assymetrical as shown in the drawing, and a lower clamping section 38. The head section 20 and the lower clamping section 38 are connected to each other by hanger 45. The lower clamping section 38 is comprised of a moveable jaw 40 adapted to pivot at point 42 and to contact an item, such as a document (not shown), positioned adjacent a stationary jaw 44. Jaw 40 is attached to a moveable member 46 by a link 48. A compressed spring 50 normally pushes upward against the upper portion of member 46, causing jaw 40 to rotate about point 42 in a direction to grasp the document being transported. Release of the document when required is effected by downward pressure upon the upper portion of member 46 in opposition to the spring force. The latter causes jaw 40 to pivot away from stationary jaw 44.

Figure 3:
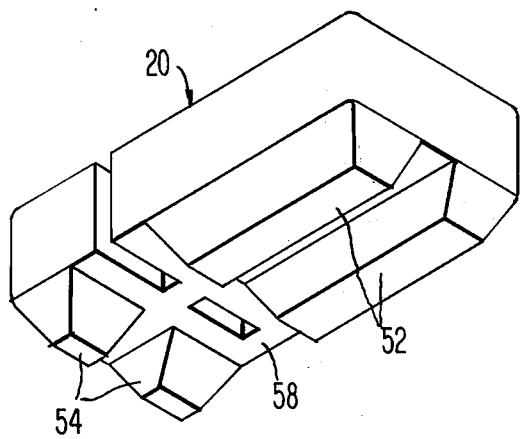
FIG. 3 illustrates the tooth-like structures on the underside of the carrier head.

With continued reference to FIG. 2, and additional reference to FIG. 3 which depicts the underside of the carrier head 20, the carrier is shown being transported on belt 12, disposed in a channel 14 and having a guide rail 16. The underside of the carrier head 20 comprises along the long portion thereof, tooth sections 52 adapted to mesh with the teeth in horizontal belt 12. Along the short portion of carrier head 20, tooth sections 54 appear. While the latter sections do not play a specific role in the operation of the diverter gate of the present invention, they are adapted to engage the teeth in a vertically disposed belt to implement a powered turn. This operation, mentioned briefly hereinbefore, is described fully in the reference patent.

FIG. 4 depicts in plan view, the gate 10 in a diverting position. It is again assumed that the carrier 18 is being transported in the direction of arrow 34 by belt 12 and has not yet reached the gate 10. It is further assumed that the carrier is to be removed from belt 12 and directed to an alternate gravity controlled path. A signal is sent to solenoid 32 by means, not illustrated, to cause the energization thereof. This signal may be initiated by an operator or may be derived automatically by a device which senses the need for carrier gating. In either event, the energization of solenoid 32, causes its plunger 30 to be retracted in the direction of arrow 36. Link 28 is drawn in the same direction as plunger 36, causing bar 24 to rotate about pivot 26. The flexible member 22 of the gate is deflected like a cantilever beam and rotates outward, away from the guide rail 16, making an angle $\alpha$ therewith. In an actual embodiment $\alpha$ is approximately fifteen degrees. The rotation of gate member 22 is completed prior to the carrier 18 arriving at the gate.

Figure 5:
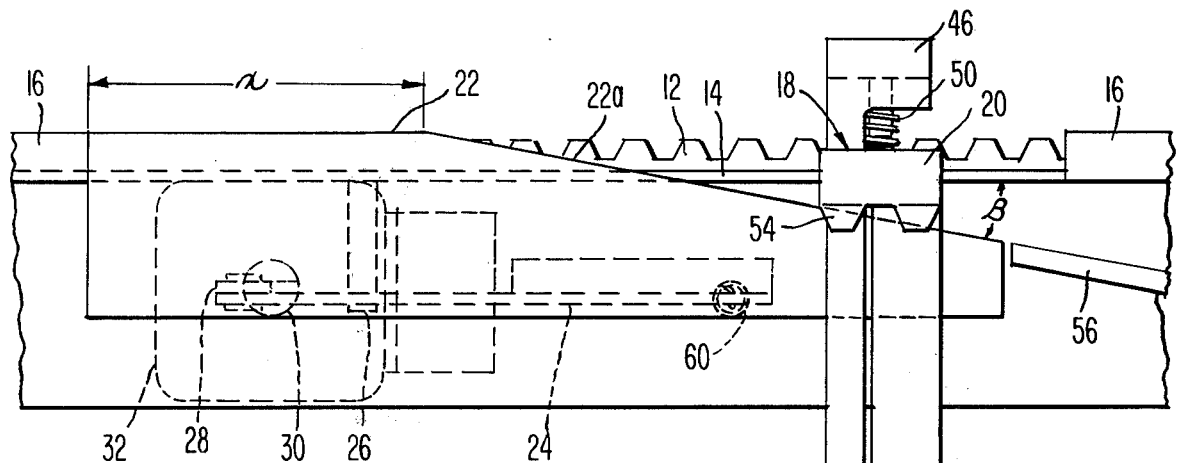
FIG. 5 is a front elevation of the diverter gate illustrating specifically the inclined portion thereof.

With continued reference to FIG. 4 and additional reference to FIG. 5, as the carrier 18 contacts the gate member 22, it is moved sideways on the plane of the drive belt 12 for a distance $x$. This permits the carrier head 20 to move partially off the drive belt 12, but to still remain in driving contact with it. At this point, additional driving from the belt 12, not only drives the carrier head sideways, but allows the carrier to drop onto the inclined portion 22a of gate member 22. It is apparent that in order for the carrier to drop onto the incline, the carrier head must pivot about the belt 12. This results from the driving motion of the belt, coupled with the kinetic energy of the carrier. The incline, represented by the angle $\beta$, may be of the order of ten degrees, although the actual angle will be dictated by system conditions, including the material of which the gate member is made. The 10° incline assumes a material having a low coefficient of friction. Materials such as UHMW-polymer, NYLATRON and ZYTEL are a few of many materials which possess low friction coefficients and also, the ability to be flexed for a large number of cycles without damage or fatigue. The gate member 22 may also be made of metal, but the higher coefficient of friction associated with the metallic surface, requires that the inclined portion 22a of the gate be designed to provide a steeper incline, that is, a larger angle $\beta$. An inclined wire or rail 56 mates with the inclined portion 22a of the active gate member 22. The surface 58 (FIGS. 2 and 3) under the carrier head 20 lying between the sets of tooth sections 52 and 54, initially contacts the inclined portion 22a of gate member 22 and subsequently rail 56 as the carrier slides downward, maintaining nevertheless, its substantial vertical alignment. It is apparent that the tooth sections 52, surface 58 under the carrier head, and hanger 45 moveable member 46 cooperate in forming a trough or groove across the lower surface of carrier head 20. The radius of curvature which may be assumed by the flexible gate member 22 when it is in a diverting position is directly proportional to the length of the last mentioned groove and the thickness of the material of which the gate member 22 is made, and is inversely proportional to the width of the groove. Depending upon system requirements, the rail 56 may assume a variety of configurations, for example, the paths provided for the carrier may be straight, curved to the right or left, or spiraled.

Immediately after the carrier has moved off the inclined portion 22a of the gate, the solenoid 32 is deenergized. A return spring 60 causes the gate member 22 and the associated linkages to assume the positions illustrated in FIG. 1.

The diverter gate of the present invention has general utility in the reference flat sorting system. One application for which it is suited involves the return of the empty carriers to a plurality of induction stations as they are needed to initiate a new sort cycle. Thus, the empty carriers circulating on a powered belt may be selectively diverted to the induction stations. The absence of a carrier in the station may be sensed, such as by photocell means, and a signal sent to a gate solenoid to divert the next available carrier to that station.

In conclusion, it is submitted that the diverter gate described herein offers an economical and reliable means of increasing the flexibility and overall economy of a conveyor system of the type described and claimed in the referenced patent. Changes and modifications of the gate may be needed to fit particular requirements. Such variations as are within the skill of the mechanical designer, and which do not depart from the true scope and spirit of the invention are intended to be covered by the following claims.

What is claimed is:

1. A diverter gate assembly for use in a conveyor system for switching from a powered transport path to a gravity controlled path comprising:

at least one carrier comprising a head portion which includes a groove disposed across its lower surface, transport means for supporting said carrier, said transport means being disposed in a "U" shaped channel, one edge of said channel being situated within said carrier groove and serving as a guide rail to retain said carrier on said transport means during movement thereof, at least one transfer area located along said channel and being characterized by the absence of said guide rail in said area, adjacent guide rail sections of said channel being present on respective opposite sides of said transfer area, a gate member comprised of flexible material, said gate member being situated in said transfer area and being interposed between said adjacent guide rail sections of said channel, one extremity of said gate member being positioned in fixed aligned relationship with a first of said adjacent guide sections, a portion of said gate member opposite said fixed extremity being inclined with respect to the plane of said transport means, said diverter gate being capable of assuming a diverting or non-diverting mode with respect to said carrier, the other extremity of said gate member being in substantial coplanar alignment with the second of said adjacent guide sections when said gate is in a non-diverting mode and being curved outward away from said second guide section when said gate is in a diverting mode, the radius of curvature assumed by said flexible gate member in said diverting mode being directly proportional to the length of said carrier groove and the thickness of the material of said gate member and being inversely proportional to the width of said groove, and means coupled to said gate member for selectively controlling the latter in accordance with the desired gate mode.

2. A diverter gate assembly as defined in claim 1 wherein said inclined portion of said gate member is further characterized as being made of material with a low coefficient of friction.

3. A diverter gate assembly as defined in claim 1 wherein said means for controlling said gate member in accordance with the desired gate mode includes a solenoid and a plurality of linkages coupling said gate member to said solenoid.

4. A diverter gate assembly as defined in claim 3 further characterized in that said linkages include a bar having one end attached to the moveable end of said gate member and being pivotally mounted for limited rotation about the pivot, and further including a link having its extremities pivotally connected to the respective other end of said bar and to the plunger of said solenoid.

5. A diverter gate assembly as defined in claim 4 further including a spring interposed between said bar and a fixed support to return said gate member from a diverting to a non-diverting position.

6. A diverter gate assembly as defined in claim 5, wherein said transport means includes a timing belt, said carrier having a T-shaped head section wherein the lower surface on at least one side of said T-shaped section comprises toothed structures adapted to mesh with the teeth in said timing belt.

7. A diverter gate assembly as defined in claim 6 further including a transport member inclined with respect to the plane of said timing belt and positioned to mate with the inclined portion of said gate member when the latter is in a diverting position, said inclined transport member providing a gravity controlled path for conveying said carrier to its predetermined destination.

* * * * *